Nov. 9, 1954 G. T. DURST 2,693,732
QUICK REMOVABLE BOLT OR CAP SCREW
Filed Oct. 4, 1951

INVENTOR
GORDON T. DURST
BY Gustave Miller
ATTORNEY

United States Patent Office

2,693,732
Patented Nov. 9, 1954

2,693,732

QUICK REMOVABLE BOLT OR CAP SCREW

Gordon T. Durst, Chicago, Ill.

Application October 4, 1951, Serial No. 249,657

4 Claims. (Cl. 85—1)

This invention relates to a quick removable bolt or cap screw and has for an object to provide a bolt or cap screw capable of quick removal as well as of quick placement, thereby providing a saving in both assembly and in maintenance time.

A further object of this invention is to provide a quickly placeable and removable bolt or cap screw which may be used either in combination with a nut or with a threaded aperture in any mechanism so as to cut down assembly and maintenance time of the mechanism with which it is used.

A further object of this invention is to provide a quickly placeable and removable bolt or cap screw which may be on military equipment as well as civilian equipment wherever it is desired to keep the assembly and the maintenance time at a minimum.

Still a further object of this invention is to provide a quickly placeable and removable bolt for use in a threaded nut or threaded aperture in any mechanism, wherein the bolt is made of several parts, including two separate bolt parts and a bolt part locking assembly, whereby the bolt parts may be inserted into the threaded nut or threaded mechanism to substantially the ultimate holding position, then may have a lock assembling portion added, after which the assembled bolt may be given a partial rotation to draw it up tight, thereby eliminating the necessity of threading the bolt for its entire length into the threaded nut or threaded hole, and which may be quickly removed by the reverse process.

With the foregoing and other objects in view, this invention comprises the combination, construction and arrangement of parts hereinafter set forth, claimed and disclosed in the accompanying drawings, wherein:

Figure 1:
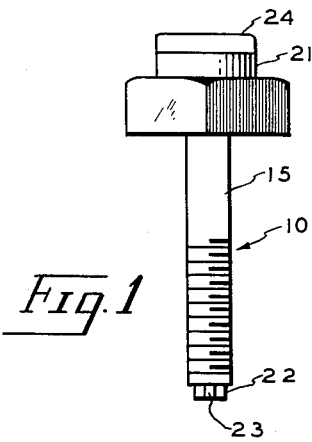
Fig. 1 is an elevational view of the assembled bolt.
Figure 6:
Fig. 6 is a transverse sectional view of the bolt parts and core on line 6—6 of Fig. 2.

There is shown at 10 the quickly removable and replaceable bolt or cap screw of this invention which may be quickly assembled and quickly removed from a threaded nut 11 or a suitable threaded aperture in any type of mechanism.

The bolt 10 is provided with an axially located cylindrical hollow 12 extending longitudinally therethrough, the hollow 12 extending through both the shank and bolt head of the bolt 10. After this cylindrical hollow 12 is provided, the bolt 10 is divided into two bolt parts 14 and 15 by a longitudinally extending slot 16 of a width at least equal to the depth of the bolt threads 17 and may be of a greater width even up to a width equal to twice the depth of a thread or very slightly more than twice. The threads 17 as well as the shank of the bolt 10 are interrupted adjacent the spacer slot edges preferably so that the threads 17 are equally spaced between such slot edges and extend about 90 degrees circumferentially thereabout. Hence, the slot edges are each provided with flattened sides 18. As a result of such construction it is not necessary to thread the bolt 10 into the threaded part of the nut 11 or other threaded mechanism, but instead one bolt part 14 may be inserted longitudinally therein, and then the other bolt part 15 may subsequently be inserted therein after the first bolt part 14 has been moved transversely to line up its threads 17 with the threads in the nut 11. If the slot space 16 is equal to at least twice the depth of the threads, and the slot sides 18 are made of corresponding size, then both bolt parts 14 and 15 could be inserted simultaneously until the bolt has been inserted the maximum distance.

Then, to hold the bolt parts in proper assembled position, a bolt lock is provided consisting of a core cap 21 of greater diameter than the cylindrical hollow 12 and preferably of no greater diameter than the diameter of the bolt head. Depending from this core cap 21 is a core position 22 having a diameter about equal to the diameter of the cylindrical hollow 12, and preferably at the end thereof, there is provided a pair of oppositely extending transverse lock lugs 23, the thickness of these lock lugs 23 being no greater than the width of the bolt part slot space 16, and the length of these lock lugs 23 being such that they extend a distance greater than the diameter of the hollow 12 and not greater than the diameter of the roots of the bolt threads 17, whereby when the lock lugs 23 are lined up with the slot space 16, the core shank 22 may be inserted longitudinally down through the cylindrical hollow 12 in the bolt 10 until the core cap 21 abuts on the top of the bolt head of the bolt 10. The core shank 22 will be preferably substantially the length of the bolt 10 from the top of the bolt head to the bottom end of the bolt so that when the bolt shank has been fully inserted, the lock lugs 23 will just extend beyond the end of the bolt 10 so that the lock lugs 23 may be rotated out of the space 16 beyond the end of the bolt. Obviously, instead of placing the lock lugs 23 at the end of the core shank, they could be placed just under the core cap a distance equal to the thickness of the bolt head and then have appropriate slots within the bolt parts to receive the same when rotated, but the construction shown is preferred as it eliminates a necessity for these weakening slots.

Figure 2:
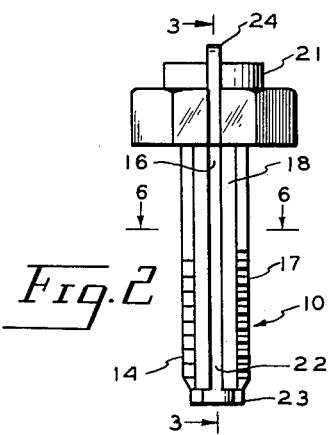
Fig. 2 is a similar view to Fig. 1 taken at right angles thereto.
Figure 4:
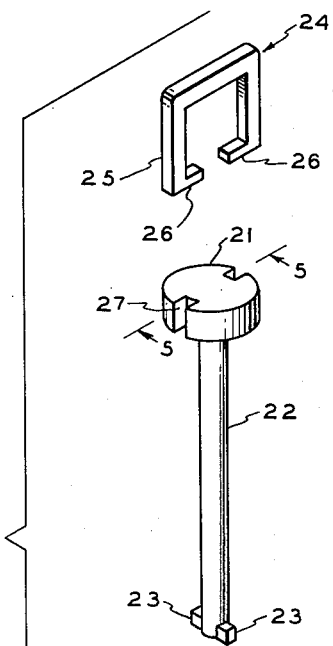
Fig. 4 is an exploded perspective view of the bolt.
Figure 5:
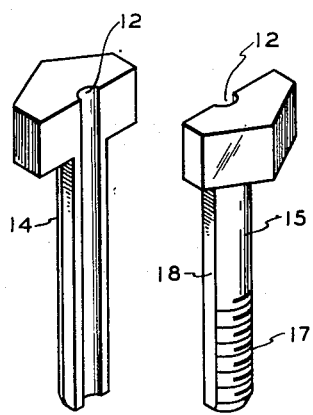
Fig. 5 is a sectional view of the core cap on line 5—5 of Fig. 4.
Figure 3:
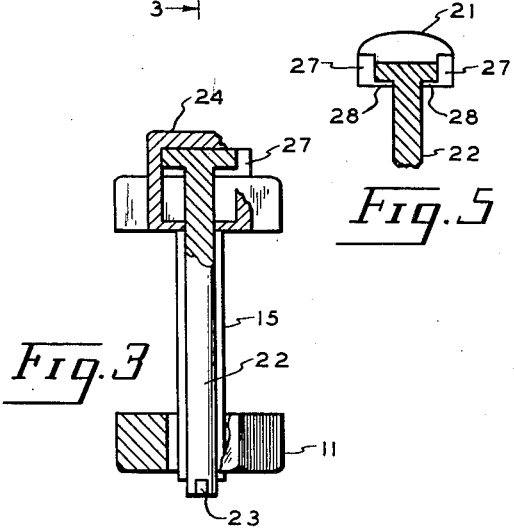
Fig. 3 is a partly fragmentary and partly sectional view of Fig. 1 showing the bolt assembled in a nut.

A slidable latch means 24 is provided consisting of a U-shaped member having U legs 25 and inturned fingers 26 whose ends are spaced apart a distance equal to the diameter of the core shank 22. The core cap 21 is provided with diametrically opposite slots 27 in a plane preferably at right angles to the plane defined by the lock lugs 23. Connected to these slots 27 through the opposite sides of the core cap 21 are a pair of bottom recesses 28 of a depth to house the inturned fingers 26. The thickness of the U legs 25 and the inturned fingers 26 is no greater than the width of the slot space 16, so that after the core has been rotated to align the plane of the spacer 24 and the slots 27 with the slot space 16, the latch means 24 may be slidably depressed to the position shown in Figs. 2 and 3 thus locking the bolt into an assembled unit, after which it may be partially rotated to tighten the bolt 10 in the threaded aperture in the nut 11 or other mechanism.

In operation to assemble the bolt in operative position, first one bolt part 14 is slid in longitudinally through the threaded part, then moved transversely to cause the threads of the bolt part to enter the threads of the nut. Then the other bolt part may be slid in alongside the first bolt part for the same distance, and thereafter the two bolt parts are held spaced apart by the amount of the slot space 16 whereupon the core shank 22 may be slid therein with the lock lugs 23 in the plane of the slot space 16 until the lock lugs 23 extend just beyond the end of the bolt 10.

At this time, the spacer 24 will be held in the maximum retracted position with the fingers 26 housed in these depressions 28 on the bottom of the core cap 21. Then when the core shank 22 has been inserted the maximum distance, and using the retracted spacer 24 as a handle, it may be rotated so as to bring the lock lugs 23 out of the plane of the spacer slot 16 and abutting against the ends of the bolt parts 14 and 15 until the latch means 24 is in the plane of the slot space 16 whereupon it may be depressed to the position shown in Figs. 1, 2 and 3. As thus assembled, the bolt 10 may then be treated as though it were an integral bolt member of usual construction, and may be partially rotated as much as necessary to completely tighten the bolt 10 in the nut 11 or other threaded parts.

To quickly remove the bolt 10, it will first be partially rotated a slight amount in a loosening position, then the spacer 24 will be retracted until the fingers 26 are housed in the depressions 28, whereupon the core shank 22 may be rotated to align the lock lugs 23 with the slot space 26, permitting the core shank to be withdrawn and then permitting the bolt parts 14 and 15 to be likewise quickly withdrawn. This eliminates the tedious threading and unthreading of the bolt throughout the length of its thread in the nut or other mechanism and cuts down both the assembly time and disassembly time thus considerably reducing the maintenance time necessary both in military and civilian equipment.

While the device has been shown and the structure described in detail, it is obvious that this invention is not to be considered as being limited to the exact form disclosed, and that changes in detail and construction may be made therein within the scope of what is claimed, without departing from the spirit of this invention.

Having thus set forth and disclosed the nature of this invention, what is claimed is:

1. A quickly removable bolt comprising an interrupted thread bolt means having an axially extending cylindrical hollow therethrough, said bolt means being axially divided into two complementary parts by an axially extending longitudinal slot of a width at least equal to the depth of the bolt thread, each bolt part having its interrupted thread thereon spaced from its dividing slot edges, a bolt lock comprising a core cap of greater diameter than said cylindrical hollow, a core portion extending from said core cap of a diameter to fit within said hollow, lock lug means of a thickness not greater than the slot space between said bolt parts extending transversely from said core portion a distance greater than the diameter of the hollow and not greater than the diameter of the bolt thread roots, and depressible bolt part latch means slidably retained on said core cap in a plane at an angle to the plane of said lock lug means, whereby said latch means may be depressed into the slot space between said bolt parts after said lock lug means has been rotated away from the plane of the slot space between said bolt parts to thereby lock said bolt parts and core into an assembled bolt means in an operative location, and thereafter may be disassembled for quick removal from such operative position.

2. A quickly removable bolt comprising an interrupted thread bolt means having an axially extending cylindrical hollow therethrough, said bolt means being axially divided into two complementary parts by an axially extending longitudinal slot of a width at least equal to the depth of the bolt thread, each bolt part having its interrupted thread thereon spaced from its dividing slot edges, a bolt lock comprising a core cap of greater diameter than said cylindrical hollow, a core portion extending from said core cap of a diameter to fit within said hollow, lock lug means of a thickness not greater than the slot space between said bolt parts extending transversely from said core portion a distance greater than the diameter of the bolt thread roots, and depressible bolt part latch means slidable retained on said core cap in a plane at an angle to the plane of said lock lug means, whereby said latch means may be depressed into the slot space between said bolt parts after said lock lug means has been rotated away from the plane of the slot space between said bolt parts to thereby lock said bolt parts and core into an assembled bolt means in an operative location, and thereafter may be disassembled for quick removal from such operative position, said spacer means comprising a slide latch part having a radially extending boss at its end, said core cap having a slot through which said latch may slide, said core cap also having a recess on its bottom complementary to said boss to house the same when said latch means is retracted.

3. A quickly removable bolt comprising an interrupted thread bolt means having an axially extending cylindrical hollow therethrough, said bolt means being axially divided into two complementary parts by an axially extending longitudinal slot of a width at least equal to the depth of the bolt thread, each bolt part having its interrupted thread thereon spaced from its dividing slot edges and occupying about 90 degrees of circumference, a bolt lock comprising a core cap of greater diameter than said cylindrical hollow, a core portion extending from said core cap of a diameter to fit within said hollow and of a length at least equal to the bolt and bolt head length, lock lug means of a thickness not greater than the slot space between said bolt parts extending transversely from said core portion at the end thereof and beyond the end of a bolt a distance greater than the diameter of the hollow and not greater than the diameter of the bolt thread roots, and depressible bolt part latch means slidably retained on said core cap in a plane at an angle to the plate of said lock lug means, whereby said latch means may be depressed into the slot space between said bolt parts after said lock lug means has been rotated away from the plane of the slot space between said bolt parts to thereby lock said bolt parts and core into an assembled bolt means in an operative location, and thereafter may be disassembled for quick removal from such operative position.

4. A quickly removable bolt comprising an interrupted thread bolt means having an axially extending cylindrical hollow therethrough, said bolt means being axially divided into two complementary parts by an axially extending longitudinal slot of a width at least equal to the depth of the bolt thread, each bolt part having its interrupted thread thereon spaced from its dividing slot edges and occupying about 90 degrees of circumference, a bolt lock comprising a core cap of greater diameter than said cylindrical hollow, a core portion extending from said core cap of a diameter to fit within said hollow and of a length at least equal to the bolt and bolt head length, lock lug means of a thickness not greater than the slot space between said bolt parts extending transversely from said core portion at the end thereof and beyond the end of the bolt a distance greater than the diameter of the hollow and not greater than the diameter of the bolt thread roots, and depressible bolt part latch means slidably retained on said core cap in a plane at a nangle to the plane of said lock lug means, whereby said latch means may be depressed into the slot space between said bolt parts after said lock lug means has been rotated away from the plane of the slot space between said bolt parts to thereby lock said bolt parts and core into an assembled bolt means in an operative location, and thereafter may be disassembled for quick removal from such operative position, said latch means comprising a U-shaped part having inturned fingers at the ends of its U legs, said core cap having diametrically opposite slots through which said U legs may slide, said core cap also having recesses on its bottom complementary to said inturned fingers to house the same when said latch means is retracted.

References Cited in the file of this patent

UNITED STATES PATENTS

| Number | Name | Date |
| --- | --- | --- |
| 2,011,472 | Chobert | Aug. 13, 1935 |

FOREIGN PATENTS

| Number | Country | Date |
| --- | --- | --- |
| 137,696 | Great Britain | Jan. 22, 1920 |